J. L. FULLER.
VALVE.
APPLICATION FILED APR. 20, 1914.
1,151,776.
Patented Aug. 31, 1915.
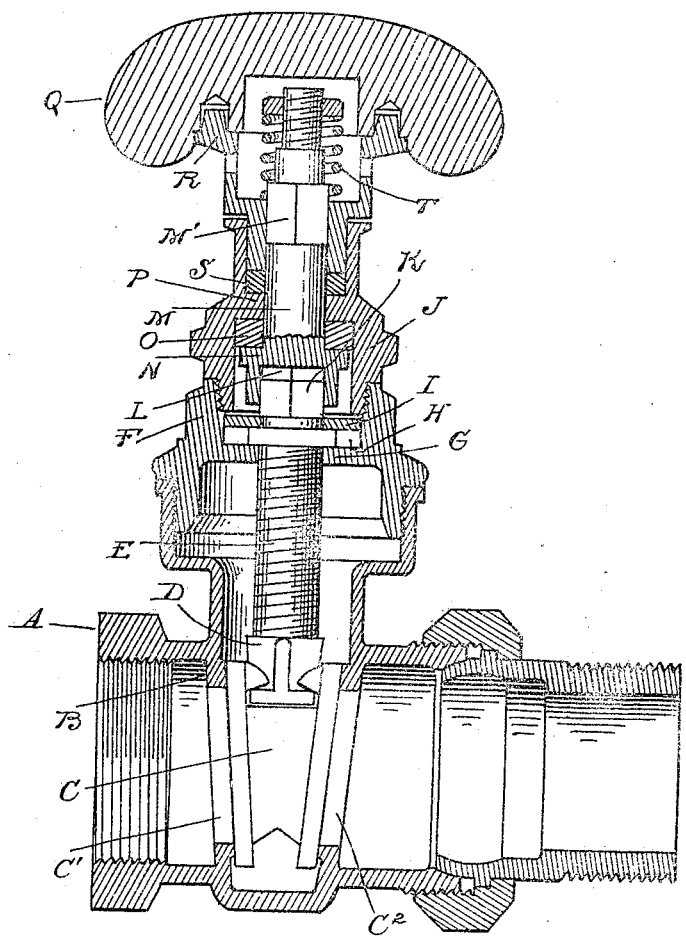
WITNESSES:
INVENTOR
John Lansing Fuller
BY
Whittemore Hulbert & Whittemore
ATTORNEYS

UNITED STATES PATENT OFFICE.

JOHN LANSING FULLER, OF DETROIT, MICHIGAN, ASSIGNOR TO DETROIT LUBRICATOR COMPANY, OF DETROIT, MICHIGAN, A CORPORATION OF MICHIGAN.

VALVE.

1,151,776.　　　　　Specification of Letters Patent.　　Patented Aug. 31, 1915.

Application filed April 20, 1914. Serial No. 833,288.

*To all whom it may concern:*

Be it known that I, JOHN LANSING FULLER, a citizen of the United States of America, residing at Detroit, in the county of Wayne and State of Michigan, have invented certain new and useful Improvements in Valves, of which the following is a specification, reference being had therein to the accompanying drawings.
The invention relates to valves of the gate type and has particular reference to the means for sealing the operating stem without the employment of the usual packing and gland.
In the drawing, a valve of my improved construction is shown in longitudinal section.

A is the valve casing which is of T-form and provided with the opposed angling seats B for a gate member C. This member is of the usual construction having opposite hinged gates C′ and C² and a threaded sleeve or nut member D engaging the threaded operating stem E.
The stem E is swiveled in a cap member F which has a web or internal flange G engaging a collar H on said stem, while above this collar is a washer or bearing plate I. This, as shown, is held in place by a threaded sub-cap member J engaging a threaded portion in the member F. The portion of the stem E above the washer I is provided with a square or polygonal head K which engages a correspondingly formed socket L in an axially alined stem member M within the sub-cap member J. This stem member has a head or beaded collar N for engaging an annular sealing disk O, the opposite face of which bears against an apertured web or internal flange P in the sub-cap member J.

Q is an operating handle which is provided with a hollow stem or follower R engaging a recess in the sub-cap member J and bearing against an annular washer S of soft material forming an anti-friction bearing which holds the hollow stem or follower R, from an end thrust bearing upon the sub-cap member. The stem M is squared at M′ to engage the hollow stem or follower R and a spring T within the hollow stem and recess in the handle, operates to exert a drawing tension on the stem M and the hollow stem R, which presses the packing washer O and bearing washer S against the opposite sides of the web member P.

With the construction above described in use, the operating stem is effectively sealed from leakage by the washer O. which on one side bears against the collar N and upon its opposite side against the web P, while the tension of the spring T maintains the close contact. At the same time the tension of this spring will press the hollow stem R against the bearing washer S which is arranged upon the opposite side of the web P. The washer S is not needed for the purpose of sealing, as this is effectively accomplished by the washer O, but it serves the function of an anti-friction bearing, preventing a metal to metal contact of the stem and casing.

Whenever the operating handle Q is turned, rotary motion is communicated from the hollow stem R to the stem M and from the latter to the threaded stem E. This will communicate a transverse movement to the gate C, and it will be noted that there is no reaction upon the sealed stem M which would tend to separate it from the sealing washer. This is for the reason that the stem M is not longitudinally moved by the stem E and therefore the unavoidable longitudinal movement of the latter due to the reaction of the valve gates C when releasing them from their seats, will not be communicated to the stem M.

What I claim as my invention is:—

1. In a valve, the combination with the casing, of a threaded stem for actuating the valve, a cap member for said casing having a swiveled bearing for said threaded stem, a second cap member, an axially alined stem in said second cap member rotatively coupled to but axially free from said threaded stem, a sealing disk between said alined stem and second cap member, an operating handle for said stem, and means for holding said stem and sealing ring in contact.

2. In a valve, the combination with a swiveled and threaded stem for actuating the valve, of an alined stem rotatively coupled to but axially free therefrom, a cap member in which said alined stem is swiveled, a sealing ring between opposed bearings on said cap member and stem swiveled therein, an operating handle rotatively coupled but longitudinally slidable on said stem, a resilient tensioning means for drawing said handle and stem together, and an anti-friction bearing for said handle upon said cap member opposed to the bearing of said sealing washer thereon.

3. In a valve, the combination with a swiveled and threaded stem for directly actuating the valve, of an alined stem rotatively coupled to but axially free from said threaded stem, said latter stem being provided with an annular enlarged bearing, a cap member having a bearing opposed to said annular bearing, a sealing washer between said bearings upon said stem and cap member, an anti-friction end thrust bearing opposed to the bearing for said sealing washer on said cap, a hollow stem member slidably engaging said alined stem and engaging said opposed anti-friction bearing, and a resilient tensioning means between said alined stem and hollow stem for holding said sealing ring and hollow stem in contact with their opposed bearings on said cap member.

4. In a valve, the combination with a casing, of a cap member, a threaded stem for operating the valve swiveled in said cap member, a second cap member recessed at its opposite ends with an intermediate web, a stem axially alined with said threaded stem rotatively coupled but axially free therefrom and swiveled in said intermediate web of said second cap member, said alined stem having an annular shoulder opposed to said web, a sealing ring interposed between said shoulder and opposed web in the inner recess of said second cap member, a bearing ring in the outer recess of said second cap member on the opposite side of said web, a handle having a hollow stem telescopically engaging said alined stem and rotatively coupled thereto, said hollow stem extending into an outer recess in said second cap member and bearing against said bearing washer therein, and a spring within said hollow stem for drawing said alined stem in contact with said sealing washer.

5. In a valve, the combination with the casing and a valve-operating stem swiveled and longitudinally fixed therein, of a cap member having recesses in its opposite ends with an intermediate web, a stem swiveled in said intermediate web alined with said valve-operating stem and rotatively coupled but axially free therefrom, said alined stem having an annular shoulder opposed to said web, a sealing washer between said shoulder and web, resilient tensioning means for holding said alined stem with its shoulder pressed in contact with said sealing ring and against said web, an anti-friction bearing in said recess on the opposite side of said web forming the opposed bearing for said tensioning means, and a handle for operating said stem.

6. In a valve, the combination with a casing, of a cap member, a valve-operating stem swiveled in said cap member, a second cap member having recesses in its opposite ends and an intermediate web, a stem swiveled in said intermediate web in alinement with said valve-operating stem, being rotatively coupled thereto but axially free, an annular shoulder on said alined stem opposed to said web, a sealing washer intermediate said annular shoulder and web, an anti-friction bearing upon the opposite side of said web in the recess in said second cap member, an operating handle having a hollow stem rotatively coupled but longitudinally slidable upon said alined stem, the end of said hollow stem seating against said anti-friction bearing in said recess, and a spring within said hollow stem for drawing said alined stem against said sealing ring and reacting against said anti-friction bearing.

7. In a valve, the combination with a swiveled and threaded stem for actuating the valve, of a cap member in which said stem is swiveled, an alined stem rotatively coupled to but axially free from said threaded stem, a second cap member in which said alined stem is swiveled provided with an internal flange, washers upon opposed sides of said flange, and resilient means for supporting said alined stem and for pressing said washers toward each other.

In testimony whereof I affix my signature in presence of two witnesses.

JOHN LANSING FULLER.

Witnesses:
J. W. HIGENBOTHAM,
THEO. FRANCOCK.